March 21, 1939.   A. E. LARSEN   2,151,215
AIRCRAFT SUSTAINING ROTOR
Filed April 30, 1938   2 Sheets-Sheet 1
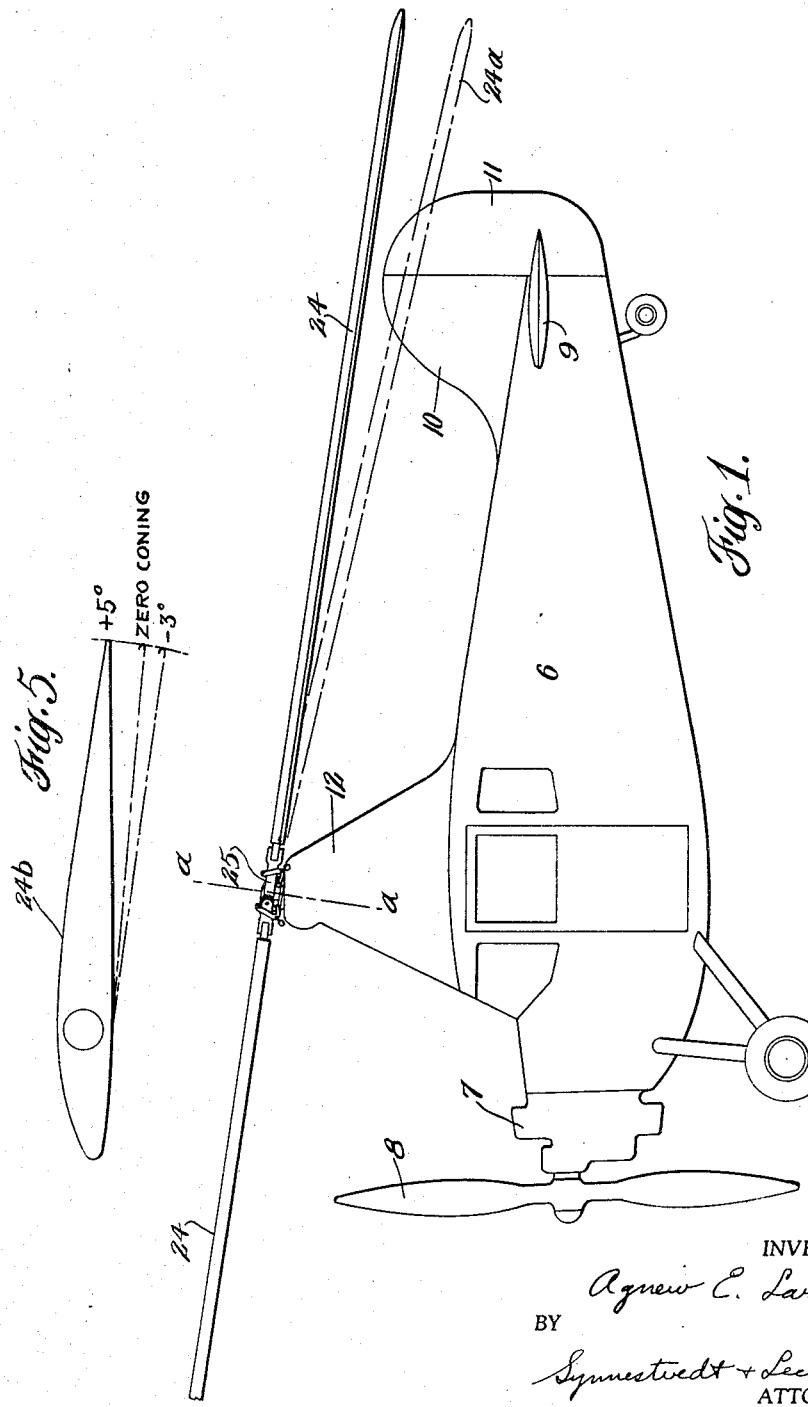
INVENTOR.
Agnew E. Larsen
BY
Synnestvedt + Lechner
ATTORNEYS.

March 21, 1939.    A. E. LARSEN    2,151,215
AIRCRAFT SUSTAINING ROTOR
Filed April 30, 1938    2 Sheets-Sheet 2
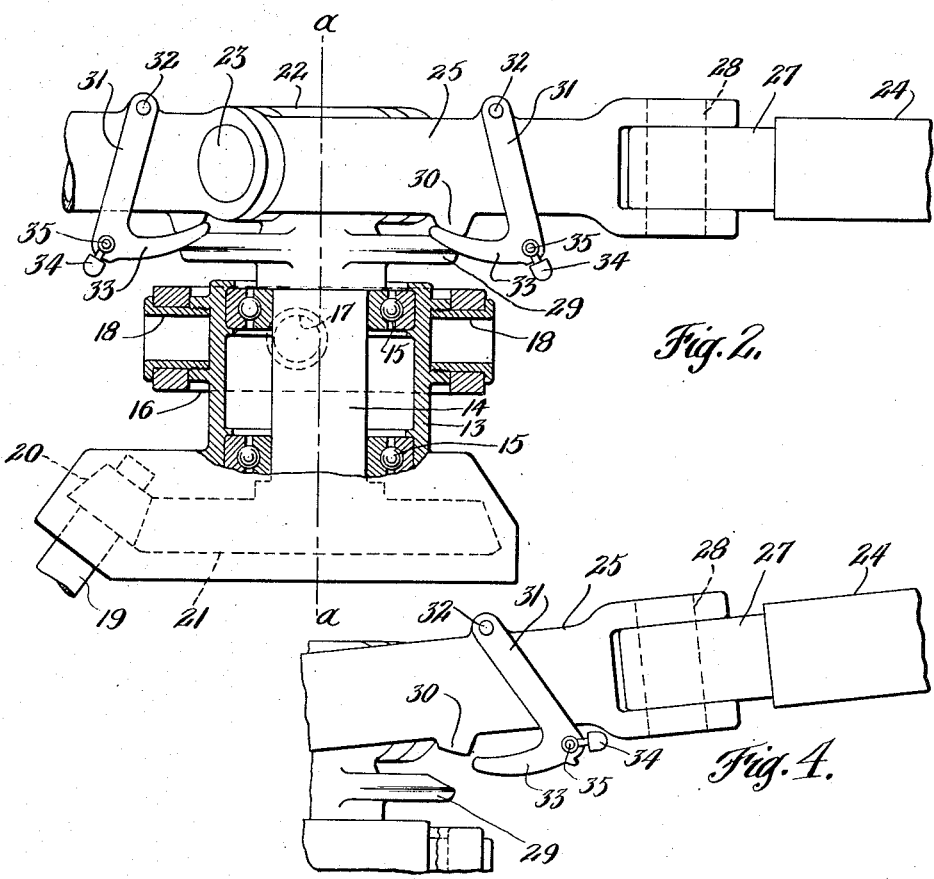
INVENTOR.
Agnew E. Larsen
BY
Symmestvedt & Lechner
ATTORNEYS Patented Mar. 21, 1939

2,151,215

UNITED STATES PATENT OFFICE 2,151,215

AIRCRAFT SUSTAINING ROTOR

Agnew E. Larsen, Jenkintown, Pa., assignor, by mesne assignments, to Autogiro Company of America, a corporation of Delaware Application April 30, 1938, Serial No. 205,227

9 Claims. (Cl. 244—18)

This invention relates to aircraft sustaining rotors and is particularly concerned with a sustaining rotor of the type in which one or more blades are pivotally connected to a hub in a manner providing freedom for blade swinging or oscillation upwardly and downwardly in a direction generally transverse the mean rotative path of travel of the blade.

The invention, moreover, is especially adapted to rotors of this general type which are further provided with a tiltably mounted hub whereby the liftline of the rotor may be shifted with reference to the center of gravity of the craft for control purposes.

In aircraft of the type referred to above, the rotor must, of course, be mounted at such height as to provide reasonable clearance between the blades thereof and other parts of the machine, for instance the empennage or tail surfaces and the propeller. Where the hub is tiltably mounted for control, the clearances must be increased in order to avoid fouling of the blades on other parts of the craft.

With the above thoughts in mind, the present invention provides mechanism for supporting the blades as against drooping and thus against fouling of other parts of the craft, which supporting mechanism provides greater freedom for downward swinging of the blades with reference to the hub in normal flight operation than when the rotor is stationary or rotating at low speeds. Bearing in mind that the blades have substantial flexibility and thus are deflected downwardly under the action of gravity when the rotor is at rest, it will be seen that the provision just above referred to makes possible mounting of the rotor somewhat lower than in prior practice while still retaining adequate clearance over the tail surfaces or propeller under all conditions of operation.

By virtue of the above it is possible to lower the center of gravity of the craft as a whole, this being of advantage for various reasons as is well recognized.

More specifically, the invention provides a droop support mechanism for the blades of an aircraft sustaining rotor, in which mechanism centrifugally operated means are employed for restricting downward drooping of the blades to a smaller angle when the rotor is rotating at low speeds than when the rotor is rotating at the normal flight speeds.

How the foregoing objects and advantages are attained, together with others which will occur to those skilled in the art will appear more fully from the following description making reference to the accompanying drawings, in which—

Figure 1 is a side outline elevational view of an aircraft incorporated the improvements of this invention;

Figure 2 is an enlarged side view of the rotor head or hub assembly and the root ends of two blades mounted on the hub, certain parts of the hub being shown in vertical section;

Figure 3 is a top plan view of certain parts shown in Figure 2;

Figure 4 is a fragmentary side elevational view of the mounting of one blade on the hub in accordance with Figure 2, certain parts of the mechanism, however, occupying different positions than in Figure 2; and Figure 5 is a diagrammatic outline of a blade section indicating change of pitch of the blade and the effect thereof with reference to downward drooping, to bring out a point fully described below.

In Figure 1 the body of the craft is shown at 6, the body having a forward propulsion engine 7 driving an airscrew 8. An empennage appears toward the rear end of the craft, the same including a horizontal surface 9, a vertical stabilizing surface 10 and a rudder 11. It may here be noted that for aerodynamic reasons it is preferable to employ stabilizing surfaces, such as shown at 10 and 11, of relatively high aspect ratio, in view of which these surfaces frequently project a substantial distance upwardly, as may clearly be seen from the drawings, but in accordance with this invention the problem of providing clearance for the rotor over such surfaces is lessened.

The rotor head is positioned at the top of the mount 12, this head (see Figure 2) including casing 13 in which the hub spindle 14 is journaled as by bearings 15.

For purposes of control of the craft in flight, the hub is desirably mounted on tilting trunnions in the general manner disclosed in the copending application of Juan de la Cierva, Serial No. 645,985, filed December 6, 1932. The specific mechanism here employed for tiltably mounting the hub includes a gimbal ring 16 which surrounds the hub casing 13 and which is tiltably carried on fixed supporting structure incorporated in the rotor mount by means of a pair of transversely aligned tilting trunnions one of which appears at 17 in Figure 2. The hub casing in turn is tiltably mounted within the gimbal ring by means of a pair of longitudinally aligned trunnions 18, the effect of this mounting being to provide freedom for tilting of the hub in all directions. It will be understood that suitable controls are carried from the hub and/or ring downwardly to the body of the craft.

The blades of the rotor may desirably be set at such pitch or incidence that they are capable of autorotative actuation in flight, although for the purpose of rotation of the rotor prior to take-off from the ground, a disconnectible drive mechanism is preferably employed for transmitting torque from the propulsion engine 7 to the rotor hub spindle 14. In Figure 2 an outline of the upper end of a drive shaft appears at 19, this shaft carrying a pinion 20 meshing with ring gear 21 which is connected with the spindle 14.

The hub spindle projects above the hub casing 13 and is provided with a hub block 22 which is apertured to receive the "flapping" pivot 23 by means of which the two blades of the rotor illustrated are connected with the hub. It will be understood, of course, that any suitable number of blades may be employed.

In the form shown, each blade 24 is connected with the hub by means of an extension link 25, this link having an inner forked end 26 embracing the hub block 22, the prongs of the fork being apertured to receive the flapping pivot 23. The blade spar 27 is desirably connected with the extension link 25 by means of a "drag" pivot 28 providing freedom for oscillation of the blade generally within its rotative path of travel.

In accordance with the present invention, downward oscillation or drooping of the blade is arrested by means of cooperating droop stops 29 and 30 carried respectively by the hub and the extension link 25. An upwardly open yoke 31 is pivotally mounted on the extension link 25 as by pivots 32 providing for swinging of the yoke toward and away from the axis of the hub. Toward its lower end, this yoke carries an abutment element 33 of arcuate shape adapted to project between the stops 29 and 30 when the yoke moves inwardly toward the hub. When positioned as in Figure 2 it will, therefore, be seen that drooping of the blades is limited by the interposition of the element 33 between the stops 29 and 30. When the rotor is rotating at substantial speeds, the action of centrifugal force on the yoke 31 and stop element 33 causes the yoke to pivot outwardly (see Figure 4) so that a substantially greater angular range of pivotal movement is permitted before downward movement of the blade will be arrested by the stop 29. The action of gravity on the yoke 31 and the part 33 when the rotor slows down is sufficient to cause part 33 to project between stops 29 and 30 and thus limit downward movement of the blade. The action of centrifugal force and of gravity may be augmented by means of one or more small weights such as shown at 34 pivotally mounted as at 35 toward the lower end of the yoke 31.

In describing the operation of this mechanism it is first noted that with the rotor in the position of Figure 1 (the full line showing of the blades 24) the hub is tilted rearwardly to its extreme limit of movement as indicated by the hub axis line a—a. In this position the blades have slight clearance over the tail surfaces when the blades project from the hub substantially in a plane perpendicular to the axis thereof, this being the blade position determined by the droop support mechanism when the stop elements 33 project between the stops 29 and 30.

The dot-and-dash line showing of a blade at 24a in Figure 1 indicates the position which the blade would occupy in the absence of the stop element 33 between stops 29 and 30, and from this showing it will be seen that the blades under such circumstances would foul the tail surfaces.

In operation when the craft is on the ground and the rotor at rest, the blades bend downwardly substantially under the influence of gravity, there being no centrifugal action thereon tending to keep them flat. At this time the stop elements 33 are positioned as shown in Figure 2, thus preventing the blades from drooping sufficiently to strike the tail surfaces. As will be seen from Figure 1, even maximum rearward tilt of the rotor hub will still leave some clearance above the tail surfaces to accommodate some bending when the stop elements 33 are effective.

When the rotor is driven prior to take-off, as substantial speed is imparted thereto, the action of centrifugal force overcomes the effect of gravity tending to bend the blades downwardly. The action of centrifugal force also causes yokes 31 and the stop elements 33 carried thereby to swing outwardly from between the stops 29 and 30, and this condition prevails during flight operation. During flight, because of the action of centrifugal force on the blades, substantially no downward bending thereof occurs, and in view of this there is no danger that the blades will foul the tail surfaces or any other part of the craft, even with maximum rearward tilt of the hub. At the same time for normal flight operation, a somewhat greater degree of freedom for flapping movement of the blades with respect to the hub is desirable than that permitted with the stop elements 33 positioned as in Figure 2. During flight, however, the stop elements 33 are displaced (as in Figure 4) and, therefore, free flapping may occur in response to flight forces.

After a landing has been made, and the rotor speed is reduced but while the blades are still air borne, the action of gravity again causes the stop elements 33 to move inwardly between stops 29 and 30 in order to arrest downward movement of the blades to the position of Figure 2 in which, even when the blades flex downwardly under the action of gravity, clearance will still be provided above the tail surfaces.

In addition to the factors mentioned above, the invention is of still further advantage in a rotor in which the blades are mounted by means of flapping pivots which are oblique when viewed in plan, as in Figure 3. For certain reasons it is desirable to employ a pivot 23 such as shown in Figure 3 making an acute angle with the longitudinal blade axis at the leading side thereof. With this angle, flapping movement of the blade is accompanied by pitch change movement thereof, upward flapping being accompanied by decrease of pitch and downward flapping by increase of pitch.

In view of this, and especially because the blade spar is ordinarily extended along a line closer to the leading than to the trailing edge thereof, downward flapping about an oblique flapping hinge of the type shown in Figure 3 causes the trailing edge of the blade to drop even further than in arrangements in which the flapping pivot axis is perpendicular to the longitudinal blade axis. This difference will clearly appear from inspection of Figure 5 in which a blade section appears in outline at 24b, the full line position representing the incidence of the blade in the upwardly coned position of substantially normal flight (for example about 5° above the plane perpendicular to the axis of rotation). As the blade droops to the zero coning position it will be seen that the trailing edge drops substantially, the drop being further increased upon negative coning to about 3°, which latter position corresponds to the position of droop permitted by the stops 29 and 30 in the absence of the element 33 therebetween.

It will, therefore, be seen that it is of especial advantage to employ the droop support mechanism of this invention in a rotor whose blades are pivoted to the hub by means of a flapping axis which makes an acute angle with the longitudinal blade axis at the leading side thereof.

I claim:

1. In an aircraft sustaining rotor having a blade mounted for oscillation in a path transverse the mean rotative path of travel thereof, droop stop mechanism for limiting downward movement of the blade including centrifugally actuated means providing greater clearance for blade drooping when the rotor is rotating at substantially normal flight speeds than when the rotor is rotating susbtantially below normal flights speeds.

2. In an aircraft sustaining rotor having a hub and a blade, pivot means for connecting the blade with the hub providing freedom for upward and downward swinging movement of the blade, a droop stop on the hub for arresting downward movement of the blade, and an element mounted for movement into and out of a position between said droop stop and the blade.

3. In an aircraft sustaining rotor having a hub and a blade, pivot means for connecting the blade with the hub providing freedom for upward and downward swinging movement of the blade, a droop stop on the hub for arresting downward movement of the blade, and an element mounted for movement into and out of a position between said droop stop and the blade, said element being operative under the influence of centrifugal force to move out of said position when the blade is rotating at a susbtantial speed.

4. In an aircraft sustaining rotor having a hub and a blade, pivot means for connecting the blade with the hub providing freedom for upward and downward swinging movement of the blade, a droop stop on the hub for arresting downward movement of the blade, and an element mounted for movement into and out of a position between said droop stop and the blade, said element being operative under the influence of centrifugal force to move out of said position when the blade is rotating at a substantial speed and being movable into said position under the influence of gravity when the rotor is rotating substantially below said speed.

5. In an aircraft sustaining rotor having a hub and a blade, mounting means connecting the blade with the hub and providing freedom for angular blade swinging in a path transverse the means rotative path of travel thereof, and mechanism for limiting drooping of the blade including means providing freedom for greater angular drooping of the blade with respect to the hub when the rotor is rotating at normal flight speeds than when the rotor is rotating susbtantially below normal flight speeds.

6. In an aircraft sustaining rotor having a hub and a blade, mounting means connecting the blade with the hub and providing freedom for angular blade swinging in a path transverse the mean rotative path of travel thereof, and mechanism for limiting drooping of the blade including means providing freedom for greater angular drooping of the blade with respect to the hub when the rotor is rotating at normal flight speeds than when the rotor is rotating substantially below normal flight speeds, said means including a centrifugally actuated device.

7. In an aircraft having a sustaining rotor, a hub tiltably mounted for control purposes, a blade connected with the hub with freedom for angular oscillation in a path transverse the mean rotative path of travel thereof, and mechanism limiting angular drooping of the blade including means providing freedom for greater angular drooping when the rotor is rotating at flight speeds than when the rotor is rotating substantially below flight speeds.

8. In an aircraft having a sustaining rotor incorporating a hub and a blade, pivot mechanism connecting the blade with the hub and including a pivot axis providing freedom for upward and downward swinging of the blade, which pivot axis makes an acute angle with the longitudinal blade axis at the leading side thereof, whereby upward and downward swinging movements of the blade are accompanied by pitch change movements thereof, and mechanism for limiting downward drooping of the blade about said pivot axis and providing freedom for greater angular drooping when the rotor is rotating at flight speeds than when the rotor is rotating substantially below flight speeds.

9. In a bladed aircraft sustaining rotor in which a blade is mounted with freedom for pivotal oscillation upwardly and downwardly with respect to the mean rotative path of travel, a droop support for the blade limiting downward pivotal movement thereof, and mechanism restricting downward pivotal movement of the blade to a position substantially above the position determined by said support when the rotor is rotating at speeds substantially below the normal flight speed.

AGNEW E. LARSEN.